Dec. 13, 1938.  F. R. MERRITT  2,139,765
MACHINE FOR INCREASING THE FLEXIBILITY OF SOLES
Original Filed Sept. 5, 1935
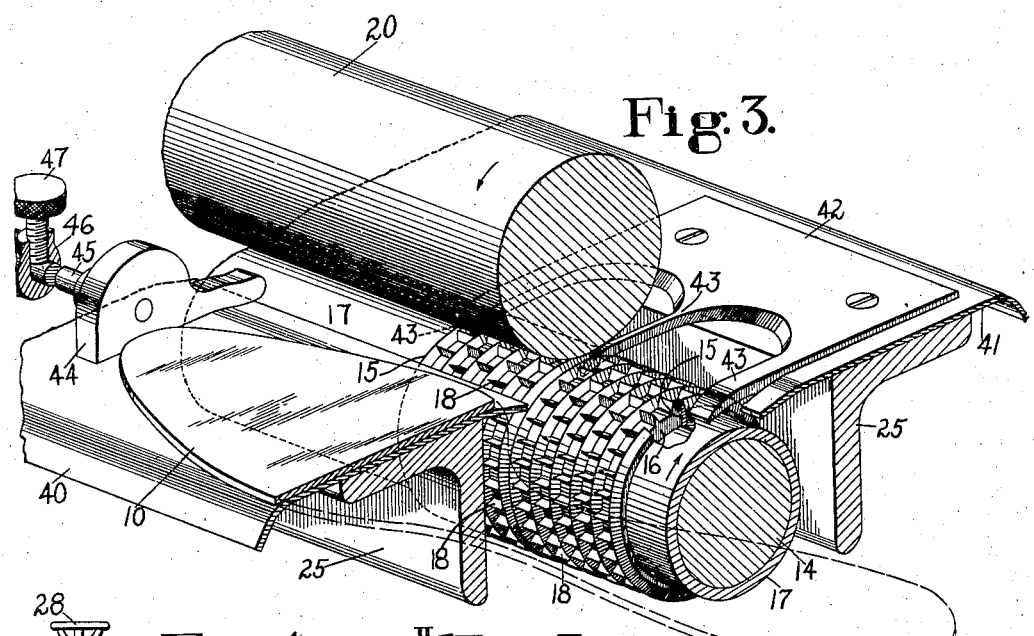
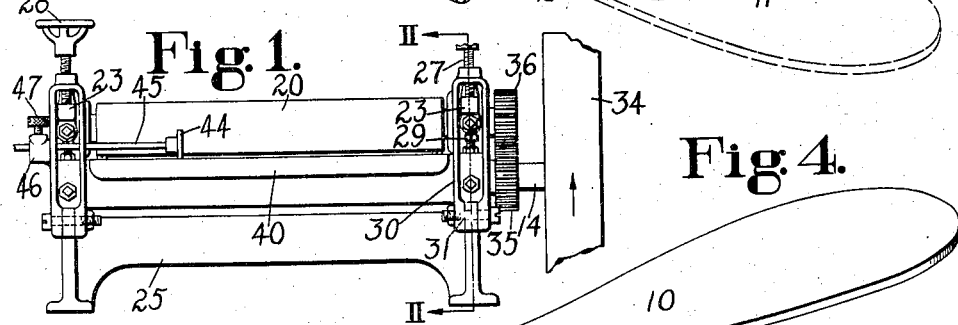
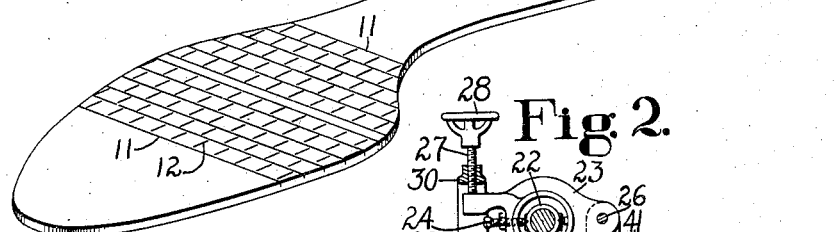
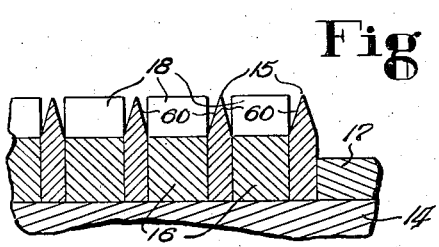
Inventor
Frank R. Merritt
By his attorney
Victor Cobb Patented Dec. 13, 1938

2,139,765

UNITED STATES PATENT OFFICE 2,139,765

MACHINE FOR INCREASING THE FLEXIBILITY OF SOLES

Frank R. Merritt, Haverhill, Mass., assignor to United Shoe Machinery Corporation, Paterson, N. J., a corporation of New Jersey Original application September 5, 1935, Serial No. 39,316. Divided and this application December 24, 1936, Serial No. 117,548

3 Claims. (Cl. 12—40)

This invention relates to machines for increasing the flexibility of soles and is herein illustrated and described as embodied in a machine suitable for use in carrying out the method disclosed in the application for United States Letters Patent Serial No. 39,316, filed September 5, 1935 in my name, of which the present application is a division.

In certain types of shoes it is desirable to provide a relatively high degree of flexibility in the ball areas by cutting gashes in those areas of the insoles before the component parts of the shoes are assembled on lasts. In the case of insoles fabricated from fibrous pulp, however, peeling of the surface stock commonly occurs as a result of cutting intersecting gashes as, for example, when some of the gashes extend lengthwise and others extend crosswise of a sole. The above-mentioned application Serial No. 39,316 discloses a method of increasing the flexibility of soles both lengthwise and crosswise without rendering the insoles subject to such peeling. As disclosed in that application, this is accomplished by cutting individual gashes in angular but non-intersecting relation in one face of the sole. Since these gashes do not intersect those portions of the sole surface that are incompletely bounded by the gashes said portions remain connected by uncut portions sufficient in number and so disposed as to guard against peeling.

It is an object of the present invention to provide an improved machine capable of gashing soles as above set forth. To this end the illustrated machine is provided with cutting means and a cutting head or platen arranged to have relative cutting movement, the cutting means comprising individual cutting edges in angular but non-intersecting relation. To utilize the cutting means also to feed the work through the machine they are organized in a rotary driven assemblage in which all the cutting edges lie in the surface of a cylinder.

Other features of the invention are hereinafter described and claimed, and are illustrated in the drawing, of which Fig. 1 is a front elevation of a machine embodying the invention;

Fig. 2 is a sectional elevation indicated by line II—II of Fig. 1;

Fig. 3 is a fragmentary perspective view of the essential elements;

Fig. 4 is a perspective view of a sole that has been rendered more flexible by cutters organized as shown in Fig. 3; and Fig. 5 is a fragmentary view in longitudinal section of the cutting members.

Referring to the specimen of work illustrated in Fig. 4, the insole 10 has been rendered more flexible in the ball area by cutting a series of long, parallel, transverse gashes 11 side by side in one face thereof and rows or columns of short individual gashes 12 between the long gashes 11 and in angular relation thereto but not intersecting them. The transverse gashes 11 extend from edge to edge of the sole and increase its flexibility in one direction, while the gashes 12 increase the flexibility of the gashed area in a different direction. Since no two gashes intersect, each subdivision of the gashed surface remains connected with the adjacent subdivision at four points, except those subdivisions that lie at the margins of the sole. These connecting portions, while not of sufficient magnitude to affect the flexibility of the sole to a noticeable degree, are nevertheless sufficient to guard against peeling of the surface from a sole fabricated from fibrous pulp.

The machine illustrated in the other figures is designed to gash a sole in the manner shown in Fig. 4. All the gashing cutters are incorporated into a rotary driven assemblage comprising the following elements:—a shaft 14, a series of thin flat cutting disks 15, steel rings 16 interposed between the disks 15, and sleeves 17, 17 arranged to clamp the disks 15 and the rings 16 one against another with sufficient pressure to prevent them from slipping. Each ring 16 is provided with a circular series of cutting teeth 18 the outer edges of which are sharpened to provide cutting edges. The rings 16 are preferably assembled to locate the teeth 18 of each out of register with those of the next ring, to the end that the short gashes 12 in the work will break joint. Formed on the margins of both faces of each disk 15 are bevels 60 to provide a sharp circular cutting edge. This double beveling provides narrow gaps between the circular cutting edges and the cutting teeth 18. Consequently, no two gashes cut by this assemblage will intersect each other. All the cutting edges preferably lie in the surface of a cylinder.

The above-described assemblage of cutters is cooperatively related to a non-resilient cutting bed or platen 20 preferably arranged above it and preferably in the form of a cylinder. Its ends are reduced to provide trunnions of smaller diameter and are journaled in bearings, one of which is indicated at 22 in Fig. 2. These bearings are carried by adjustable arms 23 to which they are connected by horizontal trunnions 24 that provide for self-aligning movement. The arms 23 are connected to the main frame 25 by pivot-pins 26 at the rear, and their forward ends are arranged to be depressed by adjusting screws 27 which may be provided with hand-wheels 28. Bosses formed on the arms 23 are arranged to bear on abutments 29, such as screws screwed into the frame 25. By means of the screws 27 and 29 the platen 20 may be positively set at any desired distance from the cutting assemblage in accordance with the thickness of the work to be gashed or the desired depth of the gashes.

To facilitate adjusting the screws 29, the screws 27 are mounted in U-shaped coupling links 30, the lower ends of which are connected to the frame 25 by pivot-pins 31. When the screws 27 are relaxed the links 30 may be swung forwardly and downwardly to release the arms 23 which may then be swung upwardly and to the rear to uncover the screws 29 and to afford access to them from above.

The shaft 14 of the cutter assemblage is journaled in bearings mortised into the frame 25, one of these bearings being indicated at 32 in Fig. 2. These bearings are secured in the frame by screws 33. A pulley 34 (Fig. 1) is affixed to the shaft 14 to receive rotation from a driving belt not shown. If it is desired also to drive the platen 20 one trunnion thereof may be provided with a spur gear 36 to receive rotation from a similar gear 35 affixed to the shaft 14.

A work-supporting table 40 is affixed to the frame 25 in front of the cutter assemblage at or slightly below the level of the space between that assemblage and the platen, and a corresponding table 41 also secured to the frame is arranged at the rear of the cutter assemblage to receive the articles of work that pass between the cutter assemblage and the platen. Moreover, a stripper plate 42 mortised into the table 41 and affixed to the frame 25 is provided with a series of stripping fingers 43 arranged to strip the work from the cutters. To permit the intermediate finger 43 to project between two of the cutting disks 15, the necessary space between these two disks is provided by a spacing ring not having any cutting teeth.

A gage 44 for locating a sole in the desired relation to the cutting assemblage is arranged on the front table 40.

To provide for adjusting this gage lengthwise of the axis of the cutter assemblage the gage is provided with a stem 45 that extends through a bore in a boss 46 formed on the frame 25. This boss is also bored and tapped with a screw-thread to receive a set-screw 47 by which the stem 45 may be secured in any desired position of adjustment.

To increase the flexibility of a sole in the manner illustrated in Fig. 4, the sole is laid on the front table 40 with its toe end against the gage 44 as represented in Fig. 3, the length of the sole being approximately parallel with the axis of the cutter-shaft 14. The operator feeds the sole widthwise only so far as to carry its leading edge into contact with the platen and the cutter assemblage which are driven to feed the sole from front to rear. The cutting teeth 18 exercise a positive feeding effect and insure that the sole will be stripped from the cutters by the fingers 43 and deposited on the rear table 41 from which it may drop to a bench or into a receptacle.

Although the illustrated machine provides for driving the platen 20 as well as the cutter assemblage, it is not essential that the platen be driven, since the driving force of the cutter assemblage alone is sufficient to feed the work and insure stripping it from the cutters. Moreover, although the cutting edges of the teeth 18 are shown as arranged to cut the gashes 12 at right angles to the gashes 11 the invention is not limited to this right-angular relation, since the cutting teeth 18 may, if desired, be skewed to cut the gashes 12 in oblique relation to the gashes 11.

Having thus described my invention, what I claim as new and desire to secure by Letters Patent of the United States is:

1. A machine for increasing the flexibility of soles comprising rotary driven cutting means and a cutting bed cooperatively related thereto and spaced therefrom less than the thickness of a sole to avoid cutting through the sole, said cutting means including a series of long parallel cutting edges side by side and spaced apart, and also including rows of short cutting edges between said long edges and angularly related thereto with the ends of all of said short cutting edges spaced from said long cutting edges to avoid intersection, the cutting edges of each row being staggered in relation to those of the adjacent rows, and all said cutting edges lying on the surface of a cylinder.

2. A machine for increasing the flexibility of soles comprising a platen and a rotary driven cutting assemblage cooperatively related thereto and spaced apart less than the thickness of a sole, said assemblage including a series of disks, each of said disks having both faces beveled to provide a circular cutting edge, and intermediate rings each provided with a circular series of cutting teeth the cutting edges of which are angularly related to said circular cutting edges to cut short individual gashes in the work, each end of each cutting edge of each tooth being spaced from the adjacent circular cutting edge by a gap corresponding to the reduction of thickness resulting from the bevel on the adjacent face of the disk on which the circular cutting edge is formed.

3. A machine for increasing the flexibility of soles comprising a platen and a rotary driven cutting assemblage cooperatively related thereto, said assemblage including a series of disks having circular cutting edges, said assemblage including also a plurality of cutting teeth between said disks and having cutting edges which are angularly related to the circular cutting edges of said disks, and a plurality of relatively stationary fingers arranged to strip soles from the cutting elements of said assemblage, said cutting teeth being omitted where necessary to accommodate said stripping fingers.

FRANK R. MERRITT.